United States Patent
Kanazawa

(10) Patent No.: US 8,912,706 B2
(45) Date of Patent: Dec. 16, 2014

(54) OSCILLATORY WAVE MOTOR CAPABLE OF DECREASING DEGRADATION OF PERFORMANCE

(71) Applicant: Canon Kabushiki Kaisha, Tokyo (JP)

(72) Inventor: Hajime Kanazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/923,109

(22) Filed: Jun. 20, 2013

(65) Prior Publication Data

US 2013/0278113 A1 Oct. 24, 2013

Related U.S. Application Data

(63) Continuation of application No. 13/051,997, filed on Mar. 18, 2011, now Pat. No. 8,487,512.

(30) Foreign Application Priority Data

Mar. 23, 2010 (JP) .................. 2010-065635

(51) Int. Cl.
*H02N 2/08* (2006.01)
*H02N 2/16* (2006.01)
*H02N 2/00* (2006.01)

(52) U.S. Cl.
CPC .............. *H02N 2/001* (2013.01); *H02N 2/163* (2013.01); *H02N 2/006* (2013.01)
USPC ............ 310/323.03; 310/323.04; 310/323.08; 310/341

(58) Field of Classification Search
CPC ..... H02N 2/001; H02N 2/005; H02N 2/0055; H02N 2/006; H02N 2/10; H02N 2/12
USPC .................. 310/341, 323.03, 323.05, 323.08
See application file for complete search history.

(56) References Cited

U.S. PATENT DOCUMENTS

| | | | | |
|---|---|---|---|---|
| 4,763,148 A | | 8/1988 | Tsukimoto et al. | |
| 5,172,023 A | * | 12/1992 | Kawai et al. ............. | 310/323.04 |
| 5,225,734 A | * | 7/1993 | Nakanishi ................ | 310/323.03 |
| 5,363,006 A | * | 11/1994 | Yano et al. ............... | 310/323.11 |
| 5,578,887 A | * | 11/1996 | Shirasaki ................. | 310/323.08 |
| 6,323,579 B1 | * | 11/2001 | Yagita et al. ............. | 310/323.09 |
| 6,433,462 B2 | * | 8/2002 | Fukui et al. .............. | 310/323.04 |
| 2013/0193803 A1 | * | 8/2013 | Yamasaki et al. ........ | 310/323.16 |

FOREIGN PATENT DOCUMENTS

| JP | H02-253217 A | 10/1990 |
|---|---|---|
| JP | 05-015174 A | 1/1993 |
| JP | 2006-288188 A | 10/2006 |

* cited by examiner

*Primary Examiner* — J. San Martin
(74) *Attorney, Agent, or Firm* — Canon USA Inc. IP Division

(57) ABSTRACT

An oscillatory wave motor includes an oscillator having an oscillation body and an electro-mechanical energy-converting element, and a flexible heat-conducting member configured to dissipate heat generated by the oscillatory wave motor. The oscillatory wave motor drives a moving body in contact with a contact portion formed in the oscillation body by an elliptical movement of the oscillator, and the heat-conducting member is provided in addition to a heat-conducting path that conducts heat generated by the oscillatory wave motor through an oscillator supporting member that supports the oscillator or a heat-conducting path that conducts heat through the moving body.

15 Claims, 4 Drawing Sheets

OSCILLATORY WAVE MOTOR CAPABLE OF DECREASING DEGRADATION OF PERFORMANCE

CROSS REFERENCE TO RELATED APPLICATIONS

This application is a Continuation of U.S. patent application Ser. No. 13/051,997 filed Mar. 18, 2011, which claims the benefit of Japanese Patent Application No. 2010-065635 filed Mar. 23, 2010, both of which are hereby incorporated by reference in their entirety.

BACKGROUND OF THE INVENTION

1. Field of the Invention

The present invention relates to oscillatory wave motors.

2. Description of the Related Art

In recent years, oscillatory wave motors have been commercially used as, for example, motors for driving auto-focus lenses of single-lens reflex cameras, because of their low-speed and large-torque characteristics. Such oscillatory wave motors are required to have a smaller size and a larger output.

In order to reduce the size while increasing the output, measures must be taken against heat generation and temperature rise of oscillatory wave motors.

That is, the energy loss, which is the energy inputted into an oscillatory wave motor but not outputted therefrom, is converted into thermal energy.

Therefore, if an oscillatory wave motor is reduced in size while increased in output, the energy loss per unit volume and the energy loss per unit surface area increase, causing temperature rise.

Such temperature rise degrades the function of components of the oscillatory wave motor and affects the performance of the oscillatory wave motor. Accordingly, measures must be taken against such a problem.

To counter this problem, Japanese Patent Laid-Open No. 3-253270 proposes an oscillatory wave motor having an increased heat dissipation efficiency, as shown in FIG. 4.

As shown in FIG. 4, this oscillatory wave motor is configured such that a piezoelectric element 104 is bonded to one side of a ring-like metallic elastic member 103 and such that alternating voltages having different phases are applied to two driving piezoelectric element groups formed on the piezoelectric element 104.

By applying the alternating voltages, two standing waves are excited on the elastic member 103. By combining these standing waves, a traveling wave, which is a bending vibration, is formed. A ring-like moving-body main ring portion 106, to which an abrasion-resistant member 107 is bonded, is pressed against the other side of the elastic member 103 by means of a pressure spring 110. The moving-body main ring portion 106 and the abrasion-resistant member 107 constitute a moving body 108. The moving body 108 and an output shaft 111 are rotated by the friction drive produced by the traveling wave formed on the elastic member 103.

Meanwhile, the above-described Japanese Patent Laid-Open No. 3-253270 takes the following measures to counter heat generation and temperature rise of the oscillatory wave motor. The frictional heat generated between the moving body 108 and an oscillator 105, which is composed of the elastic member 103 and the piezoelectric element 104, as well as the heat generated in the oscillator 105, heats the oscillator 105.

The heat is conducted from an inside-diameter portion of the oscillator 105, which is in contact with a base 102, through a heat-conducting member 116 to a cover 101 and is quickly dissipated by a fan 117.

However, this configuration requires a separately provided heat dissipating member, such as a fan, which increases the component count, making a reduction in size difficult.

Furthermore, in this configuration, the heat-conducting member 116 inhibits oscillation of the oscillator 105 and degrades the performance.

A configuration in which heat is dissipated outside without providing the fan 117 or the heat-conducting member 116, but by means of heat conduction of other members, causes the following problems. The heat generated by the friction between the elastic member 103 and the moving body 108, the heat generated in the piezoelectric element 104, the heat generated at the bonding surface between the elastic member 103 and the piezoelectric element 104, and the heat generated in the elastic member 103, at a portion near the piezoelectric element 104, are dissipated by heat conduction through an elastic-member thin portion 103-$b$ serving as an oscillator supporting member.

Alternatively, the heat is dissipated from the moving body 108 side, by heat conduction through a rubber ring 109 serving as a damper, a pressure spring 110 serving as a pressure-applying member, and an output shaft 111.

However, the elastic-member thin portion 103-$b$, serving as the oscillator supporting member, has a small thickness so as not to inhibit oscillation of the oscillator 105, and thus, has a small cross-sectional area. This is not suitable for heat conduction.

Furthermore, the rubber ring 109 serving as a damper is made of a low heat-conducting material, and the pressure spring 110 has a small thickness so as to reduce the spring constant to ensure the precision of pressure setting. This also inhibits heat conduction.

In addition, components of the oscillatory wave motor are fastened with screws and the like, and thus, heat is conducted between different components through the contact surfaces therebetween. Thus, the thermal contact resistance prevents heat conduction.

As has been described above, conventional oscillatory wave motors cannot sufficiently dissipate heat. Thus, temperature rise of oscillatory wave motors degrades the function of the components thereof and degrades the motor performance.

The present invention has been made in view of the above-described problems, and it provides an oscillatory wave motor capable of preventing degradation of performance due to temperature rise and reducing the size while increasing the output.

SUMMARY OF THE INVENTION

An oscillatory wave motor of the present invention includes an oscillator having an oscillation body and an electro-mechanical energy-converting element, and a flexible heat-conducting member configured to dissipate heat generated by the oscillatory wave motor. The oscillatory wave motor drives a moving body in contact with a contact portion formed in the oscillation body by an elliptical movement of the oscillator, and the heat-conducting member is provided in addition to a heat-conducting path that conducts heat generated by the oscillatory wave motor through an oscillator supporting member that supports the oscillator or a heat-conducting path that conducts heat through the moving body.

The present invention can provide an oscillatory wave motor capable of preventing degradation of performance due to temperature rise and reducing the size while increasing the output.

Further features of the present invention will become apparent from the following description of exemplary embodiments with reference to the attached drawings.

DESCRIPTION OF THE EMBODIMENTS

An example of the configuration of an oscillatory wave motor according to embodiments of the present invention will be described, which includes an oscillator having an oscillation body and an electro-mechanical energy-converting element. Elliptical movement of the oscillator drives a moving body in contact with a contact portion formed on the oscillation body.

First Embodiment

Figure 1:
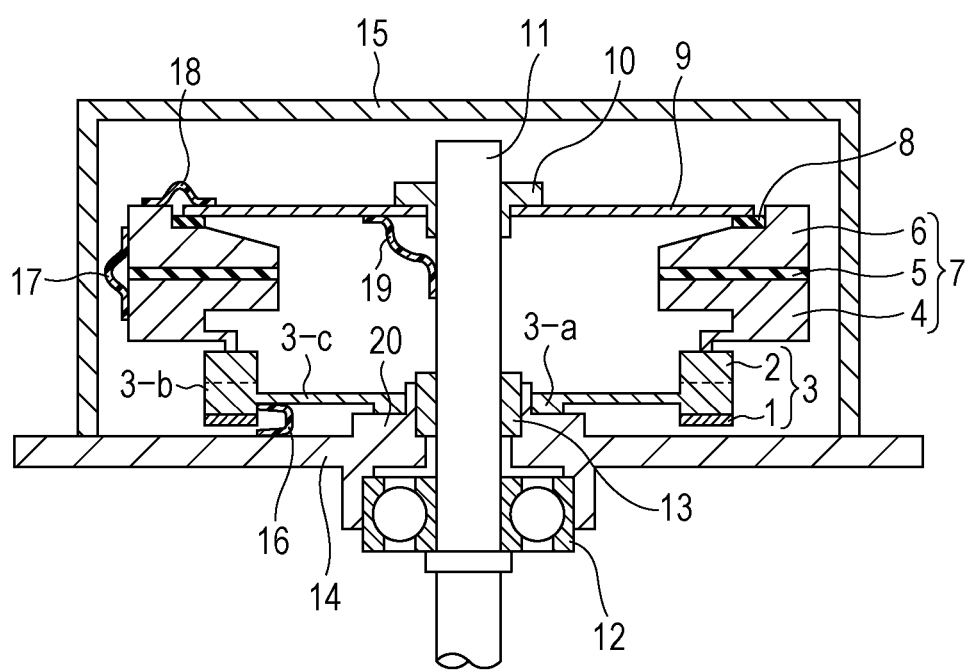
FIG. 1 is a cross-sectional view of an oscillatory wave motor according to a first embodiment of the present invention.

Referring to FIG. 1, an example of the configuration of an oscillatory wave motor according to a first embodiment of the present invention will be described.

FIG. 1 shows a piezoelectric element 1 composed of an electro-mechanical energy-converting element, a metallic elastic member (oscillation body) 2, and an oscillator 3 composed of the elastic member 2 and the piezoelectric element 1 attached to one side of the elastic member 2.

FIG. 1 also shows a moving-body contact spring portion 4, a moving-body unwanted-oscillation damper 5 composed of an elastic oscillation-attenuating material, such as rubber, for attenuating unwanted vibrations of a moving body 7, and a moving-body main ring portion 6.

The moving-body contact spring portion 4, the moving-body unwanted-oscillation damper 5, and the moving-body main ring portion 6 constitute the moving body 7.

FIG. 1 also shows an oscillation-propagation blocking damper 8 composed of an elastic oscillation-attenuating material, such as rubber, for blocking propagation of the oscillation of the moving body 7.

FIG. 1 also shows a disc spring 9 serving as a pressure-applying member, a disc-spring fixing member 10, an output shaft 11, a bearing 12, a plain bearing 13, a base 14, and a cover 15.

The driving principle of the motor is basically the same as the conventional one. The moving body 7 is rotated by the traveling wave excited by the oscillator 3.

The moving-body contact spring portion 4 follows the oscillation of the oscillator 3 to prevent noise and ensure stable rotation.

The disc spring 9 is fixed to the disc-spring fixing member 10 fitted to the output shaft 11 and presses the moving body 7 against the oscillator 3 with the oscillation-propagation blocking damper 8 therebetween.

The oscillation-propagation blocking damper 8 restrains the moving body 7 and the disc spring 9 in the rotation direction by means of a frictional force. Accordingly, when the moving body 7 is rotated, the rotational force is transmitted to the output shaft 11 through the oscillation-propagation blocking damper 8, the disc spring 9, and the disc-spring fixing member 10.

Furthermore, the oscillation-propagation blocking damper 8 serves to prevent minor oscillations of the moving body 7, caused by the oscillation of the oscillator 3, from being propagated to the disc spring 9 and to make the pressure of the disc spring 9 applied to the moving body 7 uniform.

The moving-body unwanted-oscillation damper 5 attenuates unwanted vibrations of the moving-body contact spring portion 4 caused by the oscillation of the oscillator 3.

The output shaft 11 is supported by the bearing 12 and the plain bearing 13, which are held by the base 14, so as to be freely rotated.

The oscillator 3 is fixed by caulking an oscillator inside-diameter portion 3-a to the base 14 or by fastening them with screws.

Furthermore, the motor is entirely covered by the cover 15 fixed to the base 14.

Heat-conducting members 16, 17, 18, and 19 are flexible and have the shapes of thin-plates, i.e., strips. The heat-conducting member 16 is joined to the base 14 and the oscillator 3, the heat-conducting member 17 is joined to the moving-body contact spring portion 4 and the moving-body main ring portion 6, the heat-conducting member 18 is joined to the moving-body main ring portion 6 and the disc spring 9, and the heat-conducting member 19 is joined to the disc spring 9 and the output shaft 11.

The heat-conducting members 16 to 19 are disposed such that they are in contact with the members to which they are joined with large contact areas, so as to increase the heat conductivity therebetween. The heat-conducting members 16 to 19 are bonded by adhesion, brazing, or welding.

Although the heat-conducting members 16 to 19 are made of thin copper plates, they are not limited thereto. The heat-conducting members 16 to 19 may be made of a material having high heat conductivity, such as aluminum, graphite, or carbon fiber; or a material containing the aforementioned material.

Furthermore, the heat-conducting members 16 to 19 are not limited to thin plate shaped. As long as the heat-conducting members 16 to 19 do not inhibit oscillation of the members to which they are joined, multiple string-like members, such as wires, may be provided.

A large portion of the internal frictional heat generated in the oscillator 3 is produced at the piezoelectric element 1 and an outside diameter portion 3-b of the oscillator 3, where the joint surface between the piezoelectric element 1 and the elastic member 2 is located.

Furthermore, frictional heat is generated at the frictional driving surface between the oscillator 3 and the moving body 7.

The heat generated by the oscillatory wave motor is conducted to the base 14 not only through an oscillator supporting member 3-c and a fastening surface 20 between the oscillator 3 and the base 14, but also through the heat-conducting member 16.

Because a typical oscillator supporting member has a small thickness or a thin, pin-like shape so as not to inhibit oscillation of the oscillator, the oscillator supporting member 3-c has a small thickness and. Thus, the heat conductivity thereof is not high.

Furthermore, the fastening surface 20 between the oscillator 3 and the base 14 serves as a thermal resistor.

However, because the heat conduction through the heat-conducting member 16 contributes to heat dissipation, it is possible to prevent temperature rise of the oscillator 3 and moving body 7, as well as to prevent degradation of the motor performance due to the temperature rise.

Furthermore, because the heat-conducting member 16 is flexible, it does not inhibit oscillation of the oscillator 3. Thus, the motor performance is not degraded.

The heat generated by the oscillatory wave motor is also dissipated outside by the heat conduction through the moving body 7, the oscillation-propagation blocking damper 8, the disc spring 9, the disc-spring fixing member 10, and the output shaft 11.

The heat conduction in the moving body 7 is sufficient because of the presence of the heat-conducting member 17 joined to the moving-body contact spring portion 4 and the moving-body main ring portion 6, despite the presence of the moving-body unwanted-oscillation damper 5 having low heat conductivity.

Because of its flexibility, the heat-conducting member 17 does not limit the relative positions of the moving-body contact spring portion 4 and the moving-body main ring portion 6. Thus, the function of the moving-body unwanted-oscillation damper 5 can be maintained.

Furthermore, although the oscillation-propagation blocking damper 8 has low heat conductivity too, the heat conduction between the moving-body main ring portion 6 and the disc spring 9 is sufficient because the heat-conducting member 18 is joined to the moving-body main ring portion 6 and the disc spring 9.

Because of its flexibility, the heat-conducting member 18 does not limit the relative positions of the moving-body main ring portion 6 and the disc spring 9. Thus, the function of the oscillation-propagation blocking damper 8 can be maintained.

In addition, the heat conduction between the disc spring 9 and the output shaft 11, which are fastened to each other, is performed not only through the fastening surfaces with respect to the disc-spring fixing member 10 having thermal contact resistance, but also through the heat-conducting member 19 joined to the disc spring 9 and the output shaft 11.

The heat conduction through these heat-conducting members 17 to 19 prevents temperature rise of the oscillator 3 and moving body 7, as well as degradation of the motor performance due to the temperature rise.

Furthermore, because the function of the moving-body unwanted-oscillation damper 5 and oscillation-propagation blocking damper 8 is not degraded, excellent motor performance can be achieved.

As has been described above, by providing the dampers, which constitute the oscillatory wave motor, and the flexible heat-conducting members, which form the heat-conducting paths in addition to the heat conduction by the oscillator supporting member, the heat can be dissipated without inhibiting the oscillation of the oscillator and the function of the dampers and pressure member.

Accordingly, the heat dissipation can be facilitated without affecting the motor performance, thereby preventing temperature rise of the motor and achieving excellent motor characteristics.

Furthermore, by forming the heat-conducting members from string-like or thin plate-like flexible heat-conducting members that are different from the fastening members, heat can be dissipated without inhibiting the oscillation of the oscillator.

Accordingly, the heat dissipation can be facilitated without affecting the motor performance, thereby preventing temperature rise of the motor and achieving excellent motor characteristics.

Note that the present invention can be applied to a damper, an oscillator supporting portion, and a fastening portion between components of an oscillatory wave motor having a configuration different from above.

Second Embodiment

Figure 2:
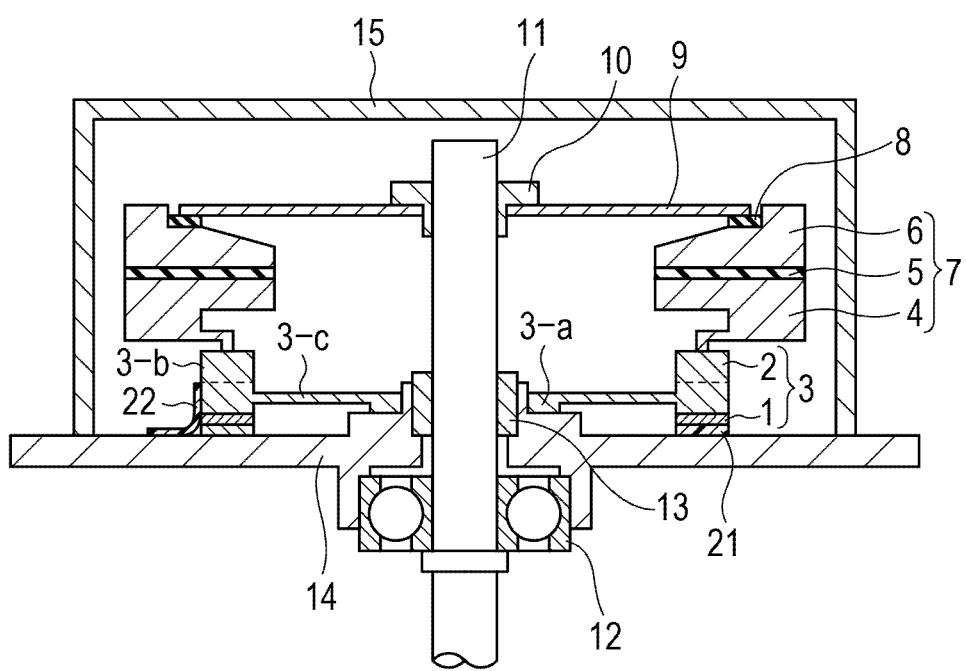
FIG. 2 is a cross-sectional view of an oscillatory wave motor according to a second embodiment of the present invention.

Referring to FIG. 2, an example of the configuration of an oscillatory wave motor according to a second embodiment of the present invention will be described.

The oscillatory wave motor according to this embodiment has a damper different from that of the oscillatory wave motor according to the first embodiment.

That is, in the oscillatory wave motor according to this embodiment, a damper for attenuating unwanted vibrations of the oscillator is provided between the oscillator and a member constituting the oscillatory wave motor, other than the oscillator.

In FIG. 2, components denoted by the same reference numerals as in FIG. 1 are the same components as in the first embodiment. Thus, detailed descriptions thereof will be omitted, and portions different from the first embodiment will be described.

An oscillator unwanted-oscillation damper 21 that attenuates unwanted vibrations of the oscillator is provided between the base 14 and the piezoelectric element 1 constituting the oscillator 3.

This serves to attenuate unwanted vibrations of the oscillator causing squeal noise, which is different from driving vibration.

A heat-conducting member 22 similar to the one according to the first embodiment, which is joined to the oscillator 3 and the base 14, conducts the heat of the oscillator 3 to the base 14 to dissipate the heat, without affecting the driving vibration of the oscillator 3 and the function of the oscillator unwanted-oscillation damper 21.

Third Embodiment

Figure 3:
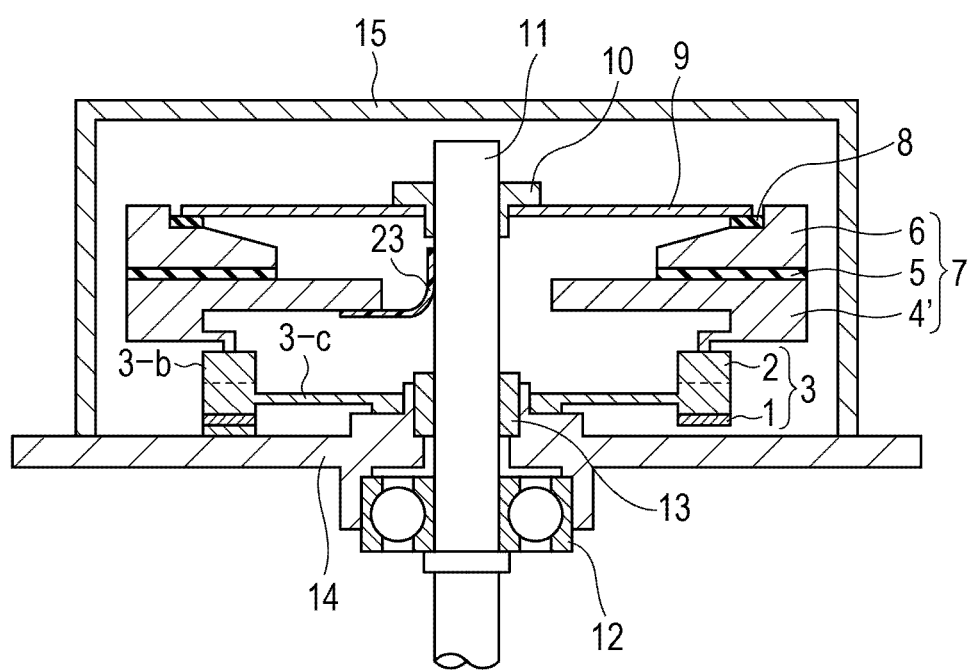
FIG. 3 is a cross-sectional view of an oscillatory wave motor according to a third embodiment of the present invention.
Figure 4:
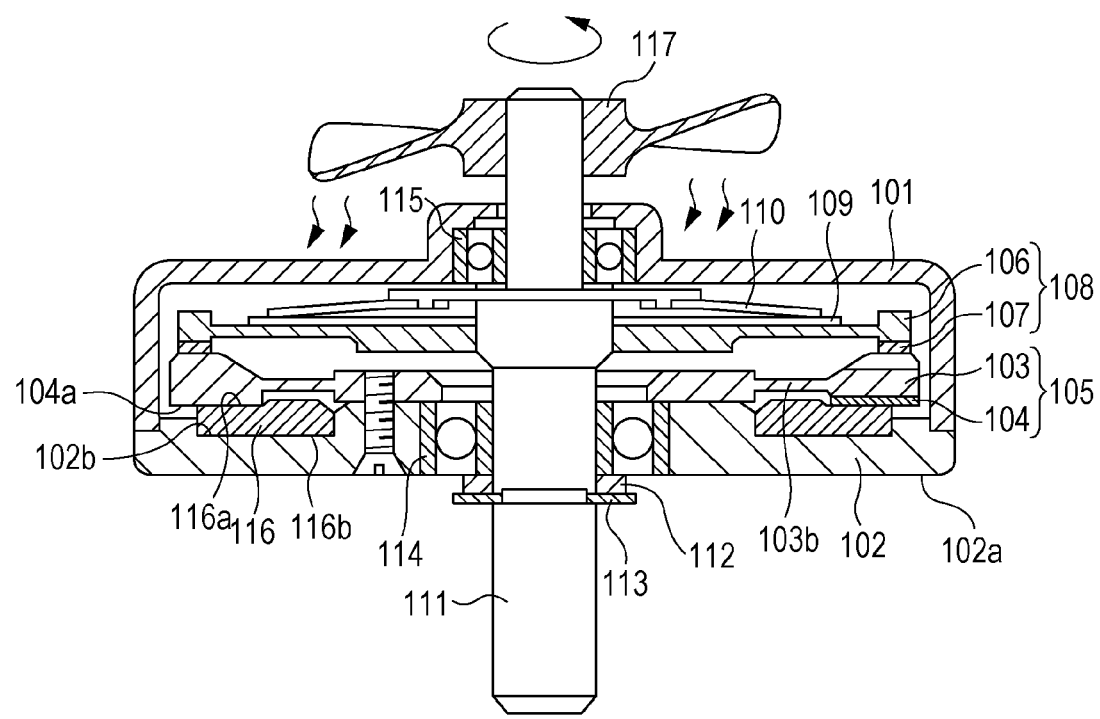
FIG. 4 is a cross-sectional view of an oscillatory wave motor disclosed in Japanese Patent Laid-Open No. 3-253270.

Referring to FIG. 3, an example of the configuration of an oscillatory wave motor according to a third embodiment of the present invention will be described.

In this embodiment, similarly to the first embodiment, a heat-conducting path is formed by a heat-conducting member, in addition to the heat conduction by the pressure member.

Among the members constituting the oscillatory wave motor, not only the dampers, which are made of rubber or the like, but also pressure members, such as pressure springs, which bring the oscillator into frictional contact with the moving body, prevent heat conduction.

The reason is as follows. That is, the pressure spring needs to have a small spring constant so that the pressure can be precisely set and variations in performance, due to a change in pressure, can be prevented, even if abrasion of the frictional driving surface progresses.

As a result, the thickness, if it is a plate spring, or the diameter, if it is a coil spring, is reduced as much as possible. Because this reduces the cross-sectional area of the heat-conducting path of the pressure member, the pressure members, such as the pressure springs, inhibit heat conduction.

In FIG. 3, components denoted by the same reference numerals as in FIG. 1 are the same components as in the first embodiment. Thus, detailed descriptions thereof will be omitted, and portions different from the first embodiment will be described.

FIG. 3 shows a heat-conducting member 23 similar to the one according to the first embodiment, which is joined to a moving-body contact spring portion 4' and the output shaft 11. The heat generated at the outside diameter portion 3-b of the oscillator 3 and the heat generated at the frictional driving surface between the oscillator 3 and the moving body 7 are conducted to the output shaft 11 through the moving-body contact spring portion 4'.

The moving-body contact spring portion 4' has a smaller inner diameter than the moving-body contact spring portion 4 according to the first embodiment, so that the length of the heat-conducting path provided by the heat-conducting member is reduced to increase the heat conductivity.

When the heat-conducting member 23 is not provided, heat is conducted through the moving-body unwanted-oscillation damper 5, the oscillation-propagation blocking damper 8, and the disc spring 9, serving as the pressure member, which have low heat conductivity. Therefore, temperature rise of the motor and degradation of the motor performance due to the temperature rise occur. However, temperature rise of the motor and degradation of the motor performance due to the temperature rise can be prevented by heat dissipation utilizing heat conduction through the heat-conducting member 23.

Because the heat-conducting member 23 is flexible, the disc spring 9 is not deformed.

In the oscillatory wave motors according to the embodiments of the present invention, the heat-conducting members are disposed in addition to the heat-conducting path that conducts heat generated by the oscillatory wave motor through the oscillator supporting member that supports the oscillator, or the heat-conducting path that conducts heat through the moving body.

Accordingly, the heat dissipation can be facilitated without inhibiting the function of the pressure member, i.e., without affecting the motor performance, thereby preventing temperature rise of the motor and achieving excellent motor characteristics.

Although the pressure member according to this embodiment is composed of a disc spring, it is not limited thereto and may be a coil spring or a plate spring of another shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An oscillatory wave motor comprising:
   an oscillator including an oscillation body and an electro-mechanical energy-converting element;
   an oscillator supporting member connected to the oscillator;
   a base on which the oscillator is mounted through the oscillator supporting member; and
   a heat-conducting member being flexible,
   wherein the heat-conducting member is in contact with the base and the oscillation body, and
   wherein the heat-conducting member has a string-like shape or a thin plate-like shape.

2. The oscillatory wave motor according to claim 1, wherein the oscillator includes a damper provided between the oscillator and the base.

3. The oscillatory wave motor according to claim 1, wherein the heat-conducting member comprises a material containing at least one of metal, graphite, and carbon fiber.

4. The oscillatory wave motor according to claim 1, wherein the oscillatory wave motor drives the moving body by an elliptical movement of the oscillator.

5. An oscillatory wave motor comprising:
   an oscillator including an oscillation body and an electro-mechanical energy-converting element;
   a moving body including a first portion, a second portion having a surface to be in contact with the oscillation body, and a damper which is provided between the first portion and the second portion, and
   a heat-conducting member being flexible,
   wherein the heat-conducting member is in contact with the first portion and the second portion.

6. The oscillatory wave motor according to claim 5, wherein the first portion is a moving-body main portion and the second portion is a moving-body contact spring portion.

7. The oscillatory wave motor according to claim 5, wherein the heat-conducting member has a string-like shape.

8. The oscillatory wave motor according to claim 5, wherein the heat-conducting member has a thin plate-like shape.

9. The oscillatory wave motor according to claim 5, wherein the heat-conducting member comprises a material containing at least one of metal, graphite, and carbon fiber.

10. The oscillatory wave motor according to claim 5, wherein the oscillatory wave motor drives the moving body by an elliptical movement of the oscillator.

11. An oscillatory wave motor comprising:
    an oscillator including an oscillation body and an electro-mechanical energy-converting element;
    a moving body in contact with the oscillation body;
    a pressure member which applies pressure to the moving body in a direction with a damper interposed between the pressure member and the moving body; and
    a heat-conducting member being flexible at least in the direction,
    wherein the heat-conducting member is in contact with an outer portion of the moving body and the pressure member.

12. The oscillatory wave motor according to claim 11, wherein the heat-conducting member has a string-like shape.

13. The oscillatory wave motor according to claim 11, wherein the heat-conducting member has a thin plate-like shape.

14. The oscillatory wave motor according to claim 11, wherein the heat-conducting member comprises a material containing at least one of metal, graphite, and carbon fiber.

15. The oscillatory wave motor according to claim 11, wherein the oscillatory wave motor drives the moving body by an elliptical movement of the oscillator.

* * * * *